United States Patent [19]
Kobayashi

[11] Patent Number: 5,367,356
[45] Date of Patent: Nov. 22, 1994

[54] CAMERA PROVIDED WITH RED-EYE PHENOMENON PREVENTING FEATURE

[75] Inventor: Ryuichi Kobayashi, Kawasaki, Japan

[73] Assignee: Canon Kabushiki Kaisha, Tokyo, Japan

[21] Appl. No.: 29,355

[22] Filed: Mar. 10, 1993

Related U.S. Application Data

[63] Continuation of Ser. No. 913,713, Jul. 16, 1992, abandoned.

[30] Foreign Application Priority Data

Jul. 16, 1992 [JP] Japan ............................. 3-175402

[51] Int. Cl.⁵ ............................................ G03B 17/18
[52] U.S. Cl. ..................... 354/471; 354/415; 354/137
[58] Field of Search ............... 354/465, 471, 472, 474, 354/475, 413, 415, 137

[56] References Cited

U.S. PATENT DOCUMENTS

| | | | |
|---|---|---|---|
| 4,285,588 | 8/1981 | Mir | 354/137 |
| 4,999,663 | 3/1991 | Nakamura | 354/415 |
| 5,070,355 | 12/1991 | Inoue et al. | 354/413 |

FOREIGN PATENT DOCUMENTS 52-80120  7/1977  Japan .

*Primary Examiner*—Russell E. Adams
*Attorney, Agent, or Firm*—Fitzpatrick, Cella, Harper & Scinto

[57] ABSTRACT

A camera includes a display device for displaying a time period extending from a time when a red-eye phenomenon preventing light is emitted to a time when a red-eye phenomenon preventing exposure operation can be performed, changing a display form.

42 Claims, 7 Drawing Sheets (a)

(b)

(c)

(d)

(e)

(f)

(g)

(h)

CAMERA PROVIDED WITH RED-EYE PHENOMENON PREVENTING FEATURE

This application is a continuation of application Ser. No. 07/913,713, filed Jul. 16, 1992, now abandoned.

BACKGROUND OF THE INVENTION

1. Field of the Invention

The present invention relates to a camera, and more particularly, to an improvement in a camera provided with a feature for preventing a red-eye phenomenon occurring in flash photography.

2. Description of the Related Art

When a person is photographed with flash light, where the distance between the optical axis of a flash unit and the optical axis of a photographic lens is close, a so-called read-eye phenomenon often occurs. This is because flash light directly reflected by a retina of an object exposes a film. Particularly, when the person is in a dark surrounding, and the pupils of the person are open, the red-eye phenomenon tends to occur. Recently, the number of flash unit integrated with a camera has increased, so that the distance between the optical axis of the flash unit and the optical axis of the photographic lens is close, and the likelihood of the red-eye phenomenon tends to increase.

In order to prevent this red-eye phenomenon, Japanese Laid-open Patent Application No. Sho 52-80120 discloses a technique for reducing the red-eye phenomenon wherein a lamp is turned on for a predetermined time before an exposure operation to close the pupils of the person being photographed.

However, with the technique disclosed in the Japanese Laid-open Patent Application No. Sho 52-80120, since a user is not informed that the exposure operation is prevented while the lamp is turned on, the user may regard the camera failing as being broken. In addition, the user cannot know how long it will take before the exposure operation is allowed.

SUMMARY OF THE INVENTION

One aspect of the present invention is to provide a camera, and a camera and a red-eye phenomenon preventing light which comprises display means for displaying a time period extending from a time when a red-eye phenomenon preventing light is emitted to a time when a red-eye phenomenon preventing exposure operation can be performed, whereby a user can easily recognize a photographic exposure preparation state extending from a time when a red-eye phenomenon preventing light is emitted to a time when an exposure free of the red-eye phenomenon can be preformed.

Another aspect of the present invention is to provide means for causing the display means of the above-described camera to perform an exposure compensation display, whereby the display is constituted, inexpensively and effectively.

Another aspect of the present invention is to provide prohibiting means for prohibiting an exposure compensation input while the display means displays a time period during which photography is prohibited, for the above-described camera, whereby an incorrect operation caused by compensating an exposure value without being displayed is prevented.

Other aspects of the present invention will become apparent from the following description of the preferred embodiment of the present invention.

DETAILED DESCRIPTION OF THE PREFERRED EMBODIMENT

A preferred embodiment of the present invention will be described with reference to the accompanying drawings.

Figure 1:
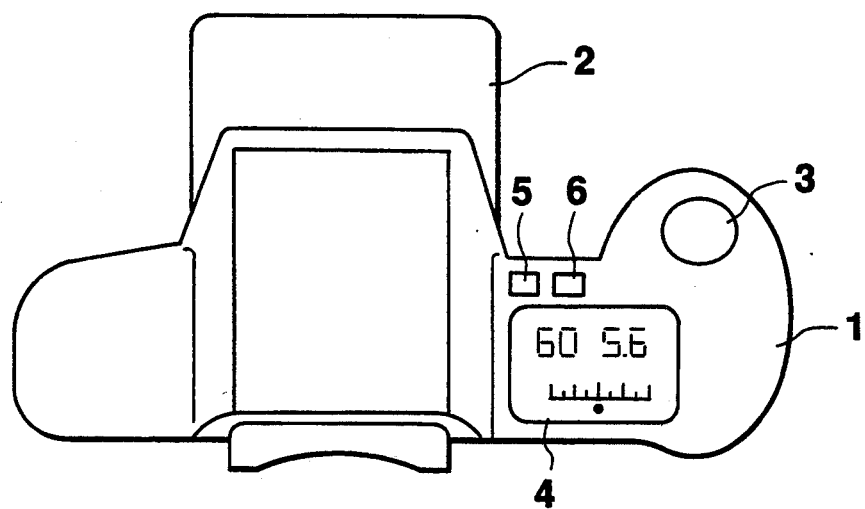
FIG. 1 is a top view of the camera in accordance with a preferred embodiment of the present invention.

FIG. 1 is a top view of a camera in accordance with the preferred embodiment of the present invention.

Referring to FIG. 1, reference numeral 1 denotes a camera body; 2, a lens barrel; 3, a release button; 4, a liquid crystal display (LCD) panel; 5, an exposure compensation-up button; 6, an exposure compensation-down button.

Figure 2:
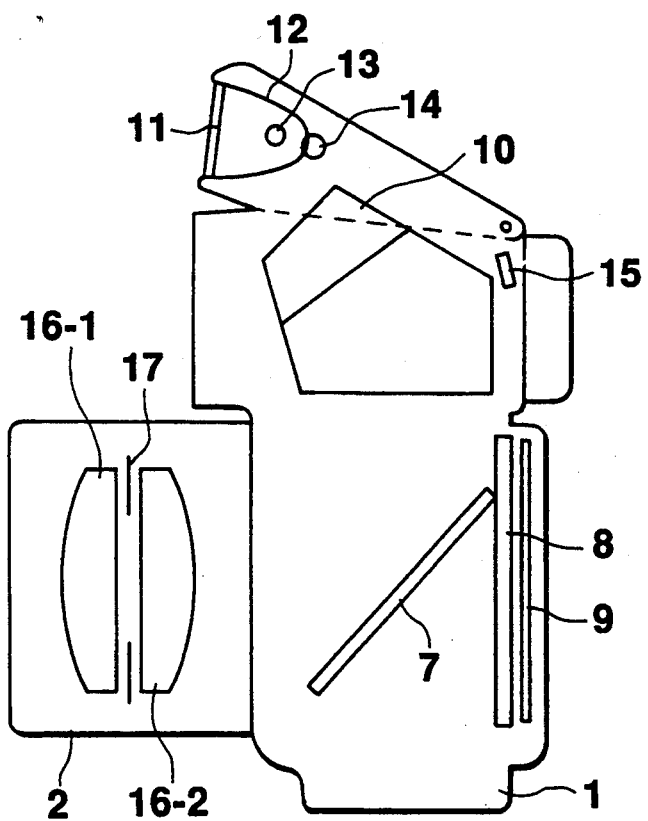
FIG. 2 is a cross-sectional view of the camera shown in FIG. 1.

FIG. 2 is a cross-sectional view of the camera shown in FIG. 1.

Referring to FIG. 2, reference numeral 7 denotes a quick return mirror; 8, a shutter; 9, a film; 10, pentaprism; 11, a Fresnel lens; 12, a reflector; 13, a xenon flash tube; 14, red-eye phenomenon preventing lamp. The Fresnel lens 11, the reflector 12, the xenon flash tube 13 and the red-eye preventing lamp 14 constitute a flash unit movable up and down in unison. Reference number 15 denotes a photosensor such as a silicon photodiode for metering a luminance of an object; 16-1 and 16-2 photographic lenses; 17, a diaphragm.

Figure 3:
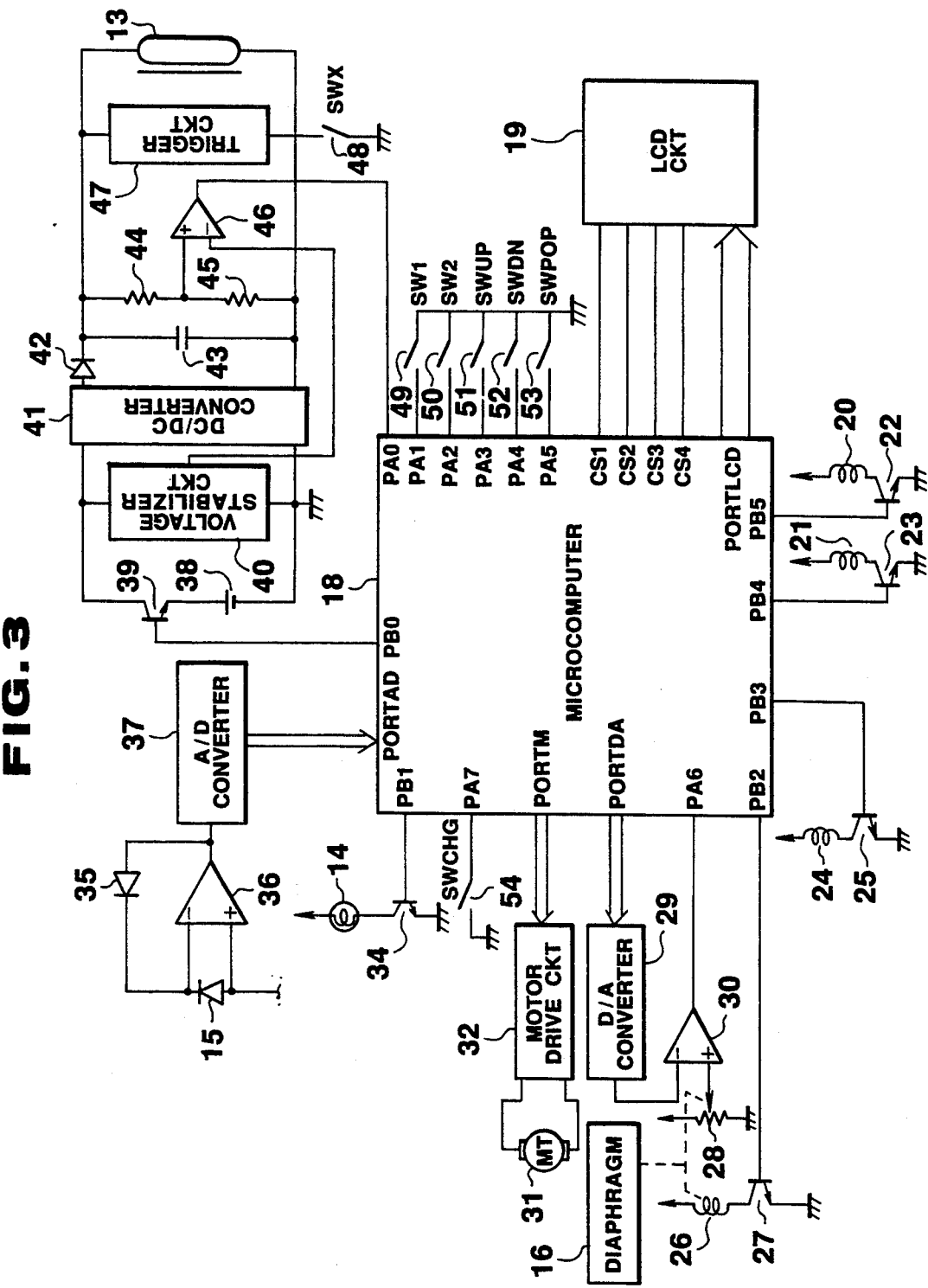
FIG. 3 is a circuit diagram of the camera shown in FIG. 1.

FIG. 3 is a circuit diagram of the camera shown in FIG. 1.

Reference character 18 denotes a microcomputer for controlling the camera; PA0–PA7, one-bit input ports; PB0–PB5, one-bit output ports; PORTM, PORTLCD and PORTDA, eight-bit parallel output ports; PORTAD, an eight-bit parallel input port; 19, an LCD circuit for performing a display on the LCD panel 4; 20, a shutter rear curtain control electro-magnet; 21, a shutter front curtain control electro-magnet; 22 and 23, transistors; 24, a mirror-up control electro-magnet; 25, a transistor; 26, a diaphragm control electromagnet; 27, a transistor; 28, a diaphragm position detection resistor; 29, a D/A converter; 30, a comparator; 31, a film wind motor; 32, a motor drive circuit; 34, a transistor; 35, a logarithmic compression diode; 36, an operational amplifier; 37, an A/D converter; 38, a battery; 39, a transistor; 40, a voltage stabilizer circuit; 41, a DC/DC converter; 42, a diode; 43, capacitor; 44 and 45, resistors; 46, a comparator; 47, a trigger circuit; 48, an X contact (referred to as SWX) that is turned on in response to completion of the shutter front curtain running; 49, a photometry switch (referred to as SW1) that is turned on in response to the first stroke of the shutter release button 3; 50, a release switch (referred to as SW2) that is turned on in response to the second stroke of the shutter release button 3; 51, a switch (referred to as SWUP) that increases an exposure compensation value by ½ step; 52, a switch (referred to as SWDN) that reduces an exposure compensation by ½ step; 53, a switch (referred to as SWPOP) that is turned on in response to the flash unit moving up; 54, a switch (referred to as SWCHG) that is turned on in response to the mirror 7 moving up and that is turned off in response to the mirror 7 moving down.

Figure 4:
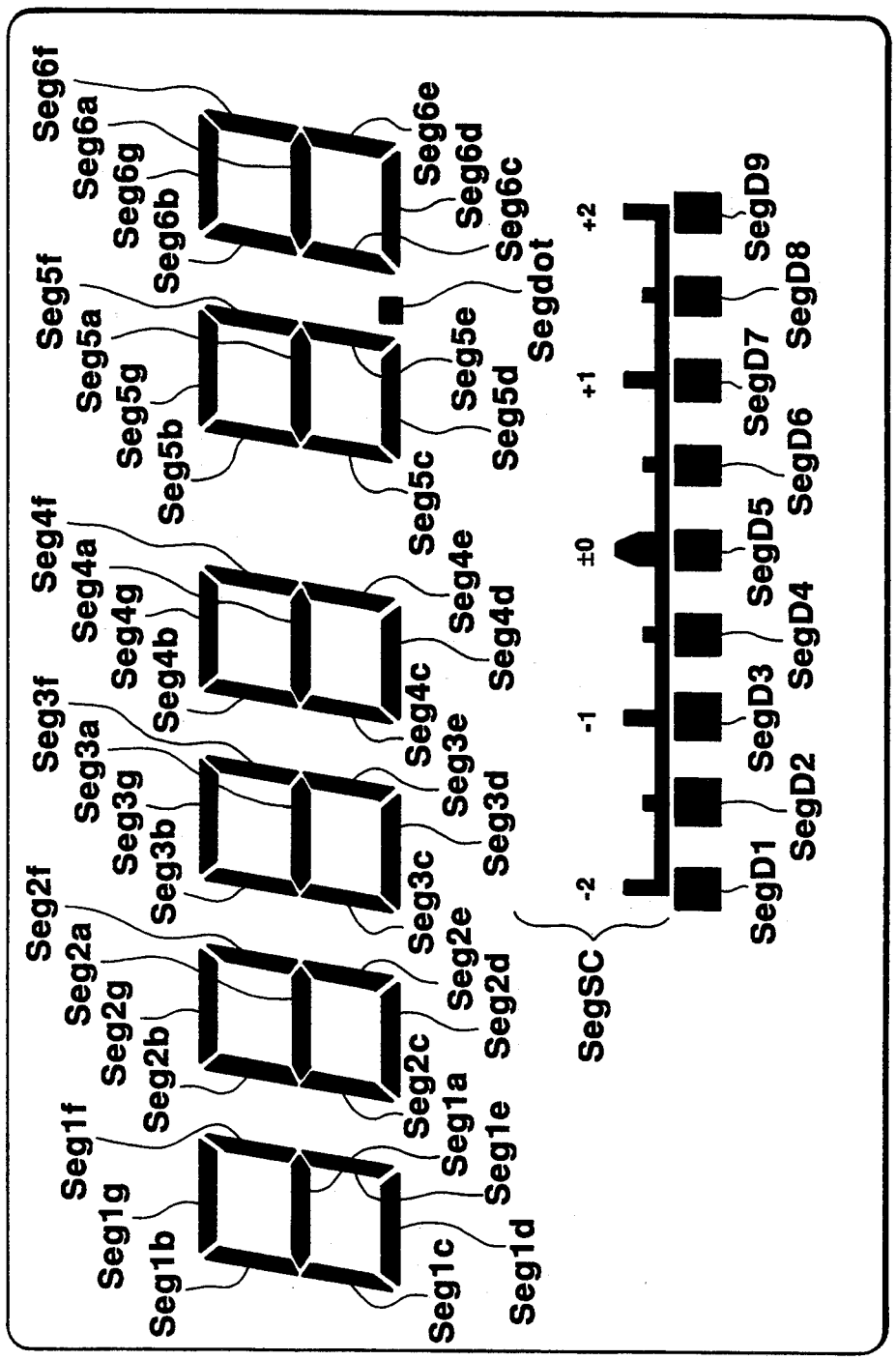
FIG. 4 is a diagram of an LCD panel of the camera shown in FIG. 1.

FIG. 4 is a detailed diagram of the LCD panel 4, wherein reference characters Segla-SegD9 denote display segments, respectively.

Figure 5:
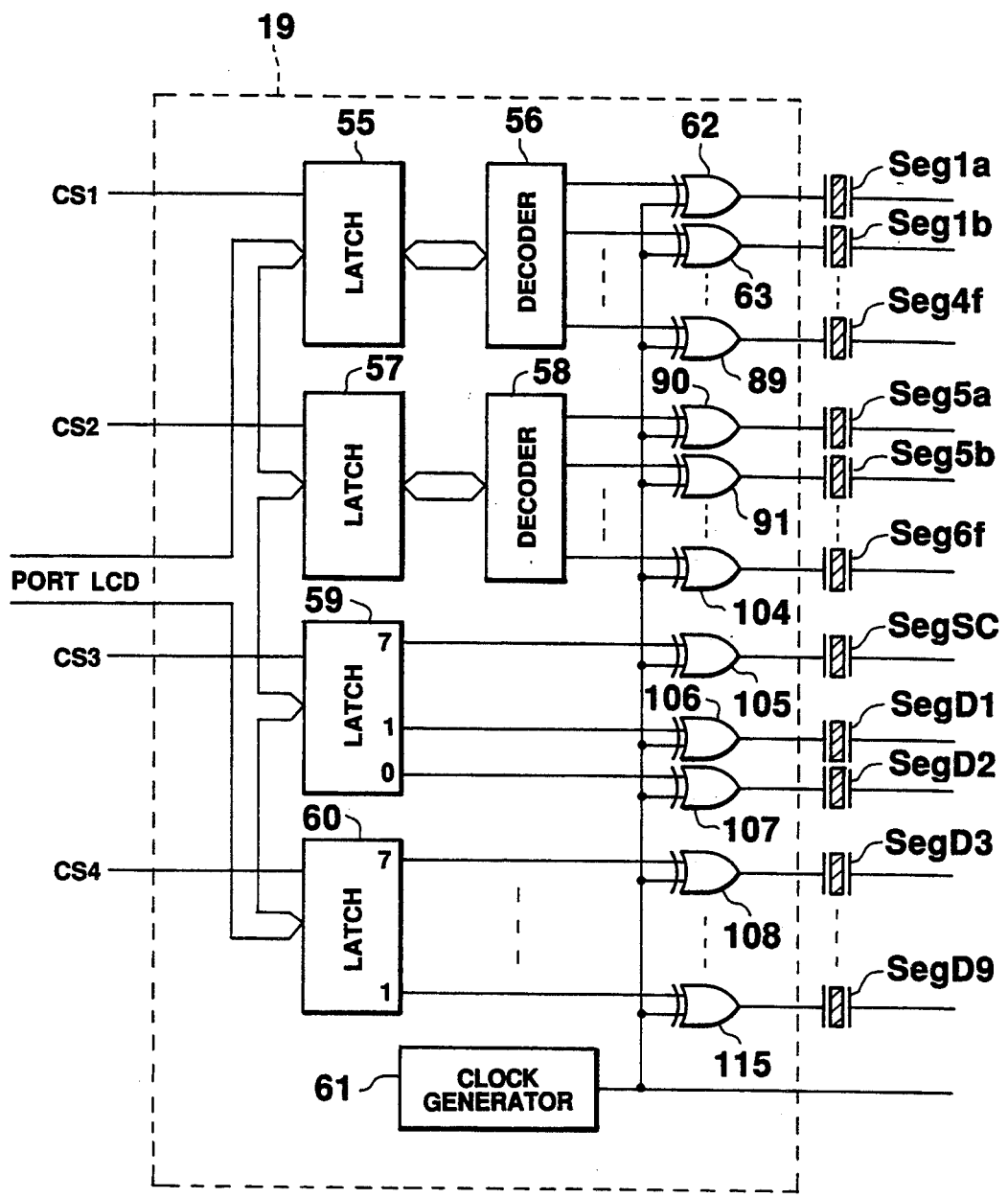
FIG. 5 is a circuit diagram of an LCD circuit of the camera shown in FIG. 1.

FIG. 5 is a detailed diagram of the LCD circuit. Referring to FIG. 5, reference numeral 55 denotes a shutter speed storage latch for storing eight-bits of data from the output port POTCLD in response to a trailing edge of a signal CS1; 56, a decoder for decoding the data stored by the shutter speed storage latch 55 into shutter speed display information; 57, a diaphragm value storage latch for storing eight-bit of data from the output port PORTLCD in response to a trailing edge of a signal CS2; 58, a decoder for 10 decoding the data stored by the diaphragm storage value latch 57 into diaphragm display information; 59 and 60, latches for storing eight-bit of data from the output port PORTLCD in response to trailing edges of signals CS3 and CS4, respectively; 61, a display clock generator; 62, an exclusive OR (EOR) gate. When the decoder 56 outputs 0, the EOR gate 62 outputs a clock signal from the clock generator 61 as the clock signal is inputted. Thus, in-phase clock signals are inputted into both terminals of the display segment Segla, and the segment Segla is turned off. Contrarily, when the decoder 56 outputs[1], the EOR gate 62 reversely outputs the clock signal of 0 from the clock generator 61, and vice versa. Thus, reverse phase clock signals are inputted into the relative terminals of the display segment Segla, and the segment Segla is turned on.

Reference numerals 63-115 (some of which are omitted in FIG. 5) denote EOR gates, which perform the same operation as the EOR gate 62.

Figure 6:
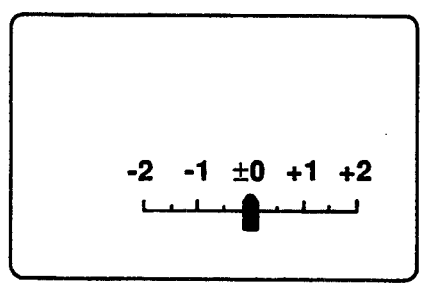
FIG. 6 is a diagram showing a display state of the LCD panel.
Figure 6:
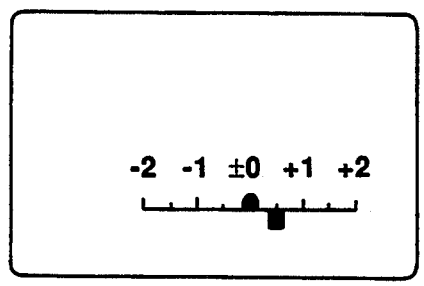
Figure 6:
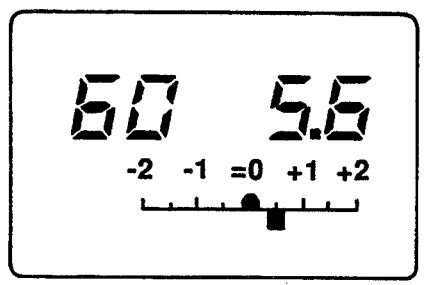
Figure 6:
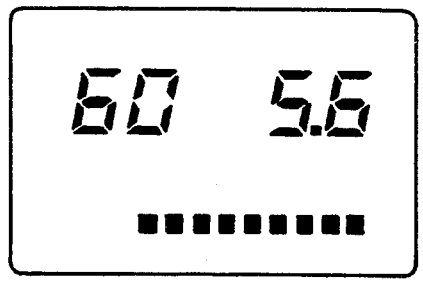
Figure 6:
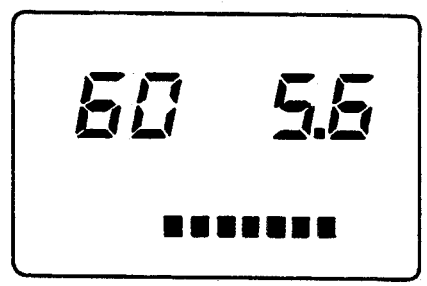
Figure 6:
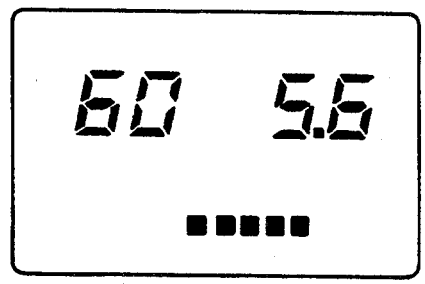
Figure 6:
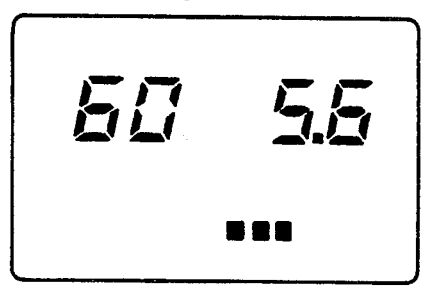
Figure 6:
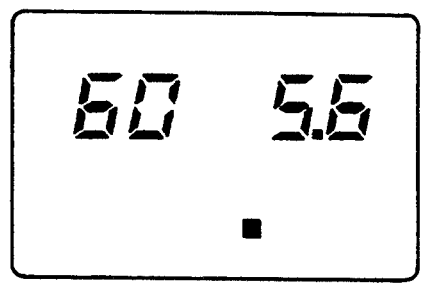

Therefore, for example, if data of 1/60 sec is stored in the shutter speed storage latch 55, the decoder 56 outputs decoded signals, such as "0000000" "1111101" "0111111" and "0000000" to the EOR gates 62-89, respectively. As a result, the numeral of "60" is displayed on the LCD panel 4 as shown in FIG. 6(c). A diaphragm value is also displayed in the same manner.

Regarding an exposure compensation display, the bit 7 of the latch 59 corresponds to a scale of exposure compensation, and the bits 0 and 1 of the latch 59 and the respective bits of the latch 60 correspond to respective display indicating the amount of the exposure compensation.

Figure 7:
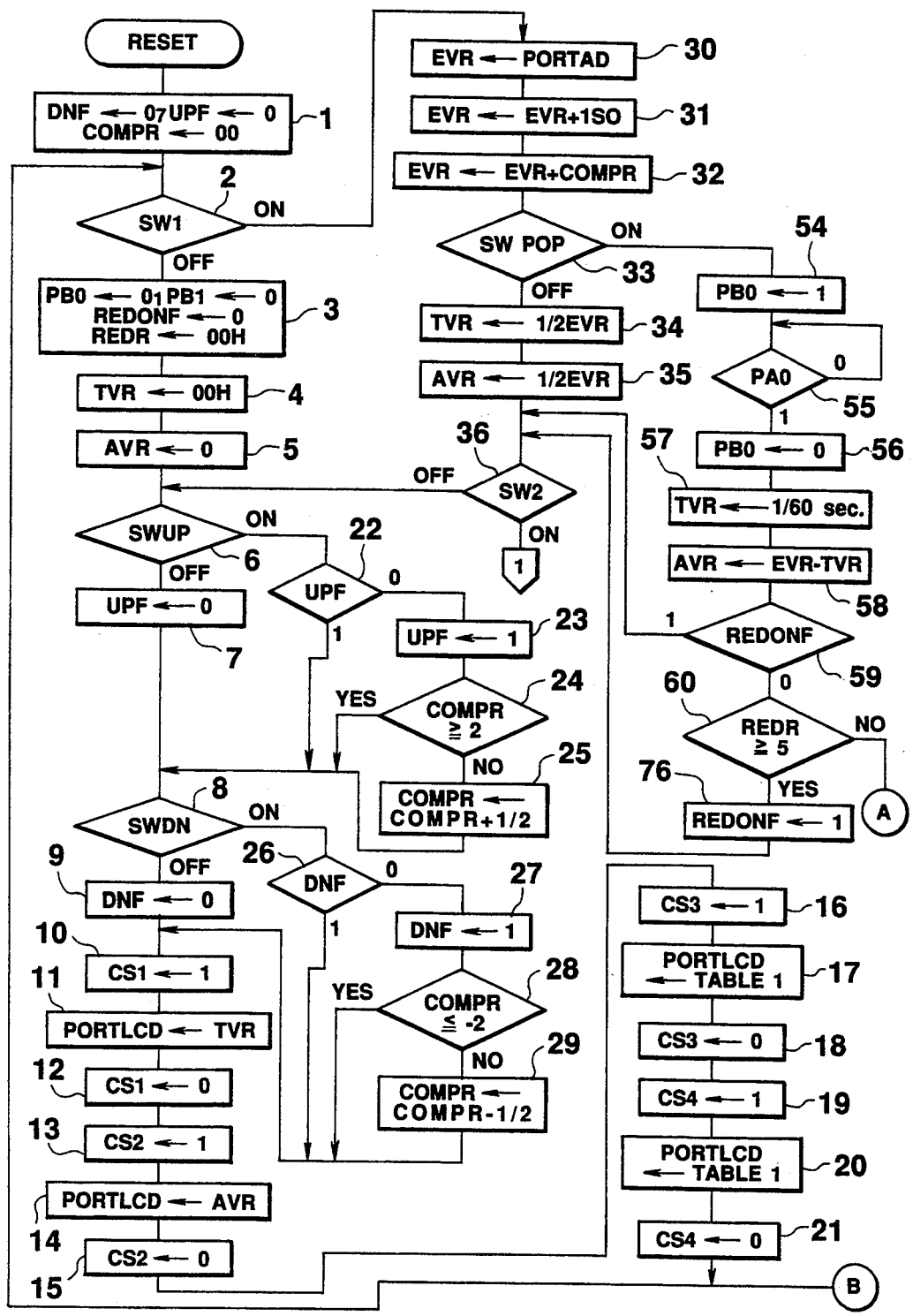
FIG. 7 is a flowchart showing an operation of a control circuit shown in FIG. 3.
Figure 8:
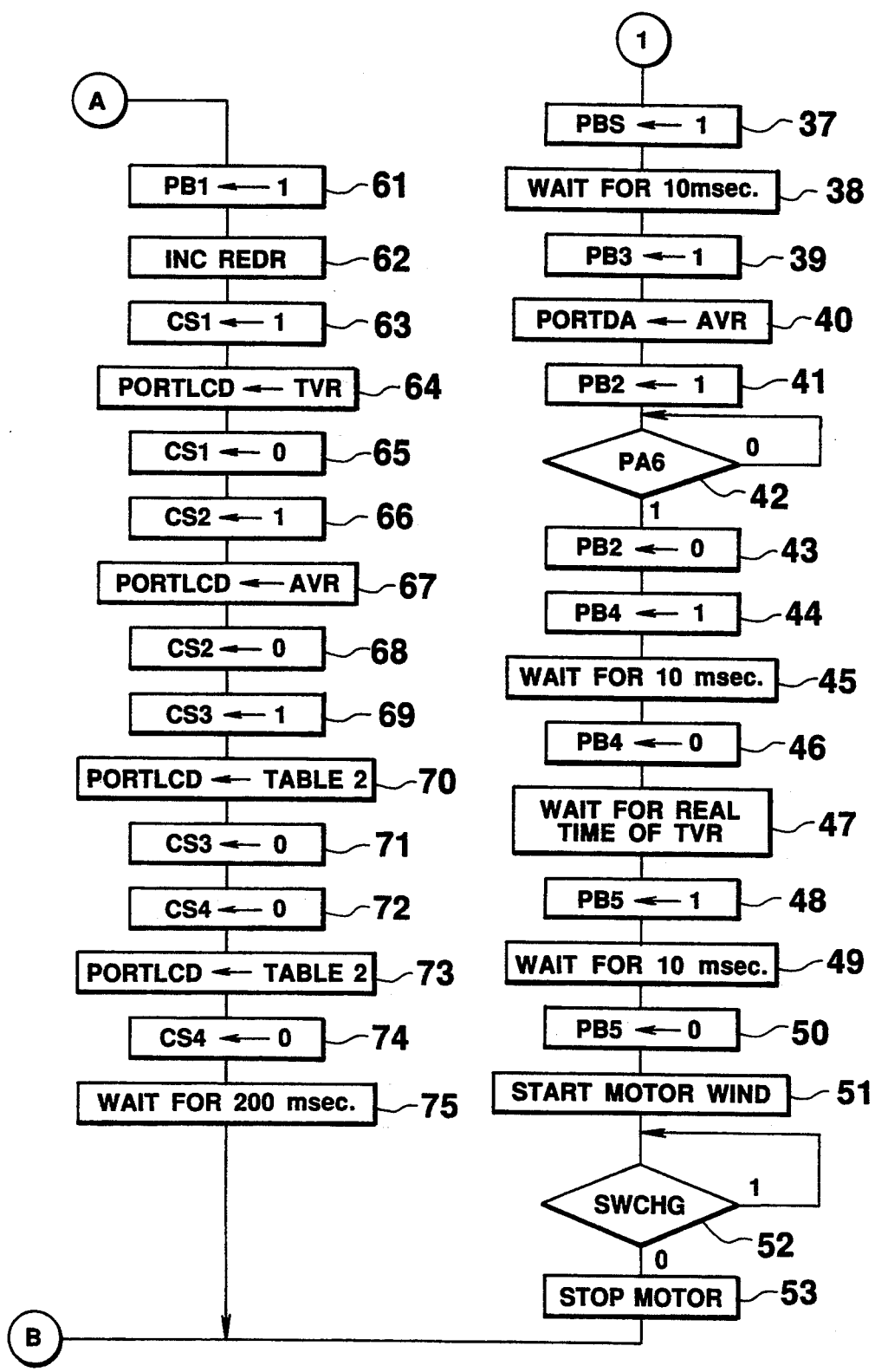
FIG. 8 is a flowchart showing the operation of the control circuit shown in FIG. 3.

Next, the operation of the aforementioned camera will be described below with reference to the flowchart of FIGS. 7 and 8 showing an operation of the microcomputer 18.

Now, with respect to the camera, it is supposed that film winding and shutter charging are completed, and the flash unit is moved down, so that the switches SW1, SW2, SWUP and SWDN are turned off. It is also supposed that the flash emitting capacitor 43 is discharged. When electricity is supplied from a battery circuit (not shown), the microcomputer 18 is reset to start the process from step 1.

Reference characters DNF, UPF and REDONF denote flags in the microcomputer 18; REDR, EVR, TVR and AVR, registers in the microcomputer 18.

[Step 1] The flags DNF and UPF are cleared, and an exposure compensation storage register COMPR is cleared to become 0.

[Step 2] It is determined whether the photometry switch SW1 is turned off. If the photometry switch is turned off, the process goes to step 3.

[Step 3] 0 is output to the output ports PB0 and PB1, and the transistor 34 is turned off to turn off the red-eye phenomenon preventing lamp 14. In addition, the transistor 39 is turned off to stop the flash emitting DC/DC converter 41. As a result, the camera is placed in a ready state awaiting operation. The flag REDONF is cleared, and the red-eye phenomenon display register REDR is cleared.

[Step 4] 0 is stored into the register TVR.

[Step 5] 0 is stored into the register AVR.

[Step 6] The state of the switch SWUP is determined. Since the switch SWUP is turned off, the process goes to step 7.

[Step 7] The flag UPF is cleared.

[Step 8] The state of the switch SWDN is determined. Since the switch SWDN is turned off, the process goes to step 9.

[Step 9] The flag DNF is cleared.

[Step 10] The signal CS1 is turned high.

[Step 11] The data stored in the register TVR is output to the output port PORTLCD.

[Step 12] The signal CS1 is turned low. The LCD circuit stores a shutter speed into the internal shutter speed storage latch 56 in response to the trailing edge of the signal CS1.

[Steps 13, 14, and 15] The data stored in the register AVR is output to diaphragm value storage latch 57 of the LCD circuit 19 in the same manner as in steps 10, 11 and 12.

[Steps 16, 17, and 18] The data stored in the register COMPR is output according to the values shown in column CS3 of Table 1 to the dot display storage latch 59 of the LCD circuit 19 in the same manner as in steps 10, 11 and 12.

[Steps 19, 20, and 21] The data stored in the register COMPR is output according to the values shown in column CS4 of Table 1 to the dot display storage latch 60 of the LCD circuit 19 in the same manner as in steps 10, 11 and 12.

As a result, the LCD circuit 19 performs such a display operation as shown in FIG. 6(a), and the process returns to step 2.

As above-described, steps 2-21 are performed over, and the state of waiting for the camera to be operated is displayed.

Now, when a user presses the switch SWUP in order to change the exposure compensation value, the process goes from step 6 to step 22.

[Step 22] The flag UPF is determined. Since the flag UPF was cleared in step 7, the process goes to step 23.

[Step 23] The flag UPF is set.

[Step 24] It is determined whether the register COMPR is less than 2. If the register COMPR is less than 2, the process goes to step 25.

[Step 25] The register COMPR is increased by ½ step

Next, the process advances from step 8 to step 21 to perform the exposure compensation display to indicate increasing the exposure compensation value by ½ step.

Accordingly, the LCD circuit 19 performs such a display as shown in FIG. 6(b).

If the switch SWUP remains being on, when the process returns to step 2 and reaches step 22, the process goes to step 22 to prohibit the value in the register COMPR from being changed. Therefore, the value in the register increases only by ½ step in response to the switch SWUP being turned on once. On the other hand, if the switch SWUP is turned off, the process goes through step 7, so that the flag UPF is cleared. Therefore, after that, if the switch SWUP is turned on again, the process goes through steps 23, 24 and 25, so that the value in the register COMPR increases.

In this manner, whenever the switch SWUP is turned on, the value in the register COMPR increases by ½ step. Thereafter, when the value in the register COMPR increases to +2 steps, the process goes from step 25 to step 8, so that increasing the value in the register COMPR is stopped.

[Steps 26, 27, 28, and 29] In the same manner as steps 22, 23, 24 and 25, whenever the switch SWDN is turned on, the value in the register COMPR can be reduced to −2 steps. In this manner, by using the switches SWUP and SWDN, the exposure compensation value can be set every ½ step from +2 steps to −2 steps, voluntarily, and also can be displayed. In this state, if the user presses down the release button 3 to the first stroke, the switch SW1 is turned on, and the process goes from step 2 to step 30.

[Step 30] The photometry sensor 15 generates an electric current in accordance with a luminance of an object to be photographed. The electric current is converted into a logarithmically compressed voltage by the logarithmic compression diode 35 and the operational amplifier 36, and then is converted into a digital value by the A/D converter 37, and is output to the input port PORTAD. The microcomputer 18 takes in the value from the input port PORTAD and stores it in the register EVR.

[Step 31] The ISO value from an ISO setting device (not shown) is added to the register EVR.

[Step 32] The exposure compensation value set from step 2 to step 29 is added to the register EVR.

[Step 33] It is determined whether the flash unit is moved down on the basis of the state of the switch SWPOP. If the flash unit is moved down, the process goes to step 34.

[Step 34] Half the value in the register EVR is stored in the register TVR.

[Step 35] Half the value in the register EVR is stored in the register AVR.

[Step 36] The state of the switch SW2 is determined. If the switch SW2 is turned off, the process goes to step 6 to set and display the exposure compensation value in the same manner as steps 2-21. At this time, since the values, which are not 0, are stored in both the register TVR and the register AVR, the shutter speed and the diaphragm value corresponding to the respective values stored in the registers TVR and AVR are displayed. That is, the LCD circuit 19 performs such a display as shown in FIG. 6(c).

In this manner, in the state where the flash unit is not moved up, if the release button 3 is pressed down to the first stroke, the luminance of the object to be photographed is metered and displayed, and the exposure compensation operation can be accepted. In this state, if the release button 3 is further pressed down, the switch SW2 is turned on, and the process goes from step 36 to step 37.

[Step 37] 1 is output to the output part PB3

[Step 38] The process waits for 10 msec.

[Step 39] 1 is output to the output part PB3. Electric current is supplied to the mirror-up control electro-magnet 24 to release a mechanical latch (not shown) and to move up the mirror 7.

[Step 40] The value stored in the register AVR is output to the output part PORTDA. The D/A converter 29 converts the signal from the port PORTDA, into an analog signal.

[Step 41] 1 is output to the output port PB2. Electric current is supplied to the diaphragm control electro-magnet 26. The diaphragm 17 is stopped down from the full aperture state in response to supplying electric current to the electro-magnet 26. The diaphragm position detection resistor 28 is slided in accordance with the operation of the diaphragm 17 to output a voltage corresponding to an amount of the diaphragm 17 being stopped down.

[Step 42] The process waits for an output from the comparator 30 to become 1, that is, for the diaphragm 17 to be stopped down to the diaphragm value output by the D/A converter 29.

[Step 43] 0 is output to the output port PB2 to stop the operation of the diaphragm 17 because the diaphragm 17 is stopped down to the set diaphragm value.

[Step 44] 1 is output to the output port PB4.

[Step 45] The process waits for 10 msec.

[Step 46] 0 is output to the output port PB4.

According to steps 44, 45 and 46, electric current is supplied to the shutter front curtain control magnet 21 for 10 msec. to run a shutter front curtain. In this manner, a film exposure operation is started. Though the switch SWX is turned on in response to the completion of shutter front curtain running, the flash unit does not emit light because the capacitor 43 is not charged.

[Step 47] The process waits for the real time corresponding to the value stored in the register TVR.

[Steps 48, 49, and 50] In the same manner as steps 44, 45 and 46, electric current is applied to the shutter rear curtain control electro-magnet 20 to run a shutter rear curtain. In this manner, the film exposure operation is completed.

[Step 51] A film wind signal is output to the output port PORTM, so that electric current is applied to the film wind motor 31. And the motor 31 charges the shutter 3, moves down the mirror 7, and winds a film.

[Step 52] The process waits for the switch SWCHG to be turned on.

[Step 53] The motor 31 is stopped.

As above-described, the photometry, the shutter release operation, and the film wind operation in the case of not using the flash unit are performed.

Next, flash photography, wherein a red-eye phenomenon preventing function is operated, will be described.

When the user moves up the flash unit, switch SWPOP is turned on. In this state, when the release button 3 is pressed down to the first stroke, the process goes from step 33 to step 54.

[Step 54] 1 is output to the output port PB0, so that electric current is applied to the DC/DC converter 41 to charge the capacitor 43.

[Step 55] The process waits for the input port PA0 to become 1, that is, the process waits for the output of the comparator 46 to turn over in response to the capacitor 43 being charged to the necessary voltage to enable the flash unit to emit light.

[Step 56] 0 is output to the output port PB0 to stop charging the capacitor 43.

[Step 57] The synchroflash shutter speed is stored in the register TVR. This synchroflash shutter speed corresponds to a shutter speed for fully opening the shutter 8. Though in the present embodiment, 1/60 sec. is used for the synchroflash shutter speed, the synchroflash shutter speed is selected in accordance with performances of individual shutters.

[Step 58] The value after subtracting the value stored in the register TVR from the value stored in the register EVR is stored in the register AVR.

[Step 59] The flag REDONF is determined. Since the flag REDONF was cleared in step 3, the process goes step 60.

[Step 60] It is determined whether the value stored in the register REDR is over 5. Since 0 1 was stored in the register FEDR in step 3, the process goes to step 61.

[Step 61] 1 is output to the output port 1 to turn on the red-eye phenomenon preventing lamp 14.

[Step 62] 1 is added to the register REDR.

[Steps 63-68] In the same manner as steps 10-15, the shutter speed and the diaphragm value are transmitted to the LCD circuit 19.

[Steps 69-74] In the same manner as steps 16-21, data is transmitted to the LCD circuit 19. However, in this case, the value stored in the register REDR, not the register COMPR, is transmitted in the values shown in CS3 and CS4 of Table 2, not Table 1. Now, since the value stored in the register REDR is 1, 03H in C54 and FEH in C54, which are hexadecimal numbers, are transmitted. As a result, the LCD circuit 19 performs such a display operation as shown in FIG. 6(d).

[Step 74] The process waits for 200 msec.

In this manner, the process loops through steps 2→33→60→61, and the value stored in the register REDR is increased 1 by 1. As a result, the display on the LCD panel 4 is changed over as shown in FIG. 6(d) →(e)→(f)→(g)→(h).

During this, the process does not go through step 36, so that the exposure operation is prohibited. And also the process does not go through steps 6 and 8, the exposure compensation operation during the red-eye phenomenon preventing operation display shown in FIG. 6(d)→(h) is prohibited.

After the process goes loops through steps 2→33→60→61 five times, that is, the red-eye phenomenon preventing lamp 14 is turned on for 1 sec., the process goes from step 60 to step 76.

[Step 76] 1 is set for the flag REDONF, and the process goes to step 36. After this, when the process reaches step 59, the process goes to step 36, and the state of the switch SW2 is determined. Therefore, after the red-eye phenomenon preventing lamp 14 is turned on for 1 sec., the exposure operation becomes possible. Furthermore, since the process comes to go through steps 6 and 8, the exposure compensation operation comes to be acceptable. Since the process goes through steps 10→21, the LCD circuit 19 performs such a display as shown in FIG. 6(c).

In this state, if the release button 3 is pressed down to the second stroke, the switch SW2 is turned on, and the process goes from step 36 to step 37. As a result, in the same manner as the case where the flash is not used, mirror moving-up, diaphragm stopping down and shutter front curtain running are performed. At this time, when the switch SWX is turned on, the trigger circuit 47 is actuated to cause the flash unit to emit light because the capacitor 43 was charged in steps 54, 55 and 56. After this, shutter rear curtain running and film winding are performed and the process returns to step 2.

As above-described, the flash photography is accomplished.

If the switch SW1 is turned off while the red-eye phenomenon preventing lamp 14 is being turned on, the red-eye phenomenon preventing lamp 14 is turned off in step 3. Once the red-eye phenomenon preventing lamp 14 is turned off, the flag REDONF and the regulator REDR are cleared. That is, the camera is arranged to prohibit the exposure operation until the 1 sec. red-eye phenomenon wait time again elapses.

In the present embodiment, through the exposure compensation display is performed outside the camera, that display can also be performed in a finder.

TABLE 1

| COMPR | CS3 | CS4 |
|---|---|---|
| −2 | 82H | 00H |
| −1.5 | 81H | 00H |
| −1 | 80H | 80H |
| −.05 | 80H | 40H |
| 0 | 80H | 20H |
| +0.5 | 80H | 10H |
| +1 | 80H | 08H |
| +1.5 | 80H | 04H |
| +2 | 80H | 02H |

TABLE 2

| REDR | CS3 | CS4 |
|---|---|---|
| 1 | 03H | FEH |
| 2 | 01H | FCH |
| 3 | 00H | F8H |
| 4 | 00H | 70H |
| 5 | 00H | 40H |

The individual components shown in schematic or block form in the Drawings are all well-known in the camera arts and their specific construction and operation are not critical to the operation or best mode for carrying out the invention.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera comprising:
    means for causing a red-eye phenomenon preventing light to be emitted;
    means for performing a red-eye phenomenon preventing exposure operation; and
    display means for displaying a time period extending from a time when the red-eye phenomenon preventing light is emitted to a time when the red-eye phenomenon preventing exposure operation can be performed.

2. A camera according to claim 1, wherein said display means comprises means for performing an exposure compensation display.

3. A camera according to claim 2, further comprising:
means for inputting an exposure compensation; and
prohibiting means for prohibiting input of the exposure compensation while said display means displays the time period.

4. A camera according to claim 1, wherein said display means comprises means for displaying the time period by changing a form of the display.

5. A camera according to claim 1, wherein said display means comprises a row of indicators, wherein each indicator has two states, and the states of the indicators in the row indicate the time period.

6. A camera according to claim 5, wherein said display means comprises means for changing the state of said indicators beginning with one end of the row of indicators to display a remaining portion of the time period.

7. An apparatus for use with a camera comprising:
input means for inputting a signal corresponding to a state of the camera; and
display means for displaying a time period extending from a time when the red-eye phenomenon preventing light is emitted to a time when the red-eye phenomenon preventing exposure operation can be performed, said display means performing a display operation in response to said input means.

8. An apparatus according to claim 7, wherein said display means comprises means for performing an exposure compensation display.

9. An apparatus according to claim 8, further comprising:
means for inputting an exposure compensation; and
prohibiting means for prohibiting input of the exposure compensation while said display means displays the time period.

10. An apparatus according to claim 7, wherein said display means comprises means for displaying the time period by changing a form of the display.

11. An apparatus according to claim 7, wherein said display means comprises a row of indicators, wherein each indicator has two states, and the states of the indicators in the row indicate the time period.

12. An apparatus according to claim 11, wherein said display means comprises means for changing the state of said indicators beginning with one end of the row of indicators to display a remaining portion of the time period.

13. An apparatus according to claim 7, wherein said input means inputs a signal corresponding to a time period extending from a time when the red-eye phenomenon preventing light is emitted to a time when the red-eye phenomenon preventing exposure operation can be performed.

14. A control apparatus, for effecting a display of information relating to a red-eye phenomenon prevention feature, comprising:
transmitting means for transmitting a signal to a display unit for performing a display operation relating to red-eye phenomenon prevention; and
control means for outputting a control signal for changing a indicating state of the information being displayed on a display unit.

15. An apparatus according to claim 14, wherein said control means comprises means for changing an indicating state being displayed on the display unit as time passes.

16. An apparatus according to claim 15, wherein said control means comprises means for outputting a control signal for displaying unit to perform an operation of red-eye phenomenon preventing unit to perform an operation of red-eye phenomenon to achieve red-eye phenomenon prevention.

17. An apparatus according to claim 16, wherein said control means comprises means for outputting a control signal for causing the display unit to display a remaining portion of a time period necessary to achieve red-eye phenomenon prevention while the red-eye phenomenon preventing unit is performing the operation of red-eye phenomenon prevention.

18. An apparatus according to claim 14, wherein said control means comprises means for outputting a control signal for controlling a display operation of the display unit while a red-eye phenomenon prevention unit for preventing red-eye phenomenon is operating.

19. An apparatus according to claim 18, wherein the red-eye phenomenon preventing unit comprises emitting means for performing a red-eye phenomenon preventing operation by emitting for a predetermined time period performing an operation of red-eye phenomenon prevention.

20. An apparatus according to claim 14, wherein the display unit comprises a plurality of indicators.

21. An apparatus according to claim 20, wherein said control means comprises means for outputting a control signal for changing a driving indicator in the plurality of indicators.

22. An apparatus according to claim 20, wherein said control means comprises means for outputting a controlling signal for changing a number of the driving indicators in the plurality of indicators.

23. An apparatus according to claim 14, wherein the apparatus comprises the display unit.

24. An apparatus according to claim 14, wherein the apparatus is provided in combination with a camera.

25. An apparatus according to claim 14, wherein the apparatus is provided in combination with an optical instrument.

26. An apparatus according to claim 14, wherein the apparatus is provided in combination with an instrument for a camera.

27. An apparatus according to claim 14, wherein the display unit is provided in combination with a camera.

28. An apparatus according to claim 14, wherein the display unit is provided in combination with an optical instrument.

29. A control apparatus for effecting a display of information relating to red-eye phenomenon prevention feature comprising:
transmitting means for transmitting a signal to a display unit for performing a display operation relating to red-eye phenomenon prevention; and
control means for outputting a control signal to the display unit for controlling a display unit is display a time period necessary for a red-eye phenomenon prevention unit to achieve red-eye phenomenon prevention.

30. An apparatus according to claim 29, wherein said control means comprises means for outputting a control signal for controlling the display unit to perform the display operation while the red-eye phenomenon prevention unit is performing the operation of red-eye phenomenon prevention.

31. An apparatus according to claim 30, wherein said control means comprises means for outputting a control signal for displaying a remaining time necessary to achieve red-eye phenomenon prevention while the red-eye phenomenon prevention unit is performing the operation of red-eye phenomenon prevention.

32. An apparatus according to claim 31, wherein said control means comprises means for changing an indicating state being displayed on the display unit as time passes.

33. An apparatus according to claim 32, wherein the display unit comprises a plurality of indicators.

34. An apparatus according to claim 33, wherein said control means comprises means for outputting a control signal for changing a driving indicator in the plurality of indicators.

35. An apparatus according to claim 33, wherein said controlling means comprises the means for outputting a controlling signal for changing number of the driving indicators in the plurality of indicators.

36. An apparatus according to claim 29, wherein the apparatus comprises the display unit.

37. An apparatus according to claim 29, wherein the apparatus is provided in combination with a camera.

38. An apparatus according to claim 29, wherein the apparatus is provided in combination with an optical instrument.

39. An apparatus according to claim 29, wherein the apparatus is provided in combination with an instrument for a camera.

40. An apparatus according to claim 29, wherein the display unit is provided in combination with a camera.

41. An apparatus according to claim 29, wherein the display unit is provided in combination with an optical instrument.

42. An apparatus according to claim 29, wherein the apparatus comprises a red-eye phenomenon prevention unit.

* * * * *

UNITED STATES PATENT AND TRADEMARK OFFICE
CERTIFICATE OF CORRECTION

PATENT NO. : 5,367,356
DATED : November 22, 1994
INVENTOR(S) : Ryuichi KOBAYASHI It is certified that error appears in the above-indentified patent and that said Letters Patent is hereby corrected as shown below:

ON THE COVER PAGE

ITEM 30

Foreign Application Priority Data
"Jul. 16, 1992 [JP]   Japan ........ 3-175402"
should read
--Jul. 16, 1991 [JP]   Japan ....... 3-175402--.

COLUMN 1

Line 19, "object" should read --eye--.

COLUMN 3

Line 4, "step;" should read --stop;--.
Line 5, "step;" should read --stop;--.
Line 12, "Seg1a-SegD9" should read --Seg1a-SegD9--.
Line 15, "Referring" should read --¶ Referring--.
Line 33, "Seg1a," should read --Seg1a,--.
Line 35, "Seg1a" should read --Seg1a--.
Line 38, "Seg1a," should read --Seg1a,--.
Line 40, "Seg1a" should read --Seg1a--.

COLUMN 4

Line 65, "½ step" should read --½ stop--.
Line 68, "½ step." should read --½ stop.--.

UNITED STATES PATENT AND TRADEMARK OFFICE
CERTIFICATE OF CORRECTION

PATENT NO. : 5,367,356                  Page 2 of 4

DATED : November 22, 1994

INVENTOR(S) : Ryuichi KOBAYASHI

It is certified that error appears in the above-indentified patent and that said Letters Patent is hereby corrected as shown below:

COLUMN 5

Line 3, "being" should be deleted.
Line 7, "½ step" should read --½ stop--.
Line 16, "step." should read --stop.--.
Line 17, "+2 steps," should read --+2 stops,--.
Line 23, "-2 steps." should read ---2 stops.--.
Line 25, "every ½ step from +2 steps to -2 steps," should read --every ½ stop from +2 stops to -2 stops,--.

COLUMN 6

Line 3, "output part PB3" should read --output port PB3--.
Line 5, "output part PB3." should read --output port PB3.--.
Line 10, "output part PORTDA." should read --output port PORTDA.--.
Line 18, "slided" should read --slid--.

COLUMN 7

Line 49, "goes" should be deleted.
Line 59, "comes to go" should read --goes--.

UNITED STATES PATENT AND TRADEMARK OFFICE
CERTIFICATE OF CORRECTION

PATENT NO. : 5,367,356  Page 3 of 4

DATED : November 22, 1994

INVENTOR(S) : Ryuichi KOBAYASHI

It is certified that error appears in the above-indentified patent and that said Letters Patent is hereby corrected as shown below:

COLUMN 9

Line 61, "a" should read --an--.

COLUMN 10

Line 1, "displaying unit" should read --displaying a time period necessary for a red-eye phenomenon preventing unit--.

Line 2, "preventing unit to perform an" should be deleted.

Line 3, "operation of read-eye phenomenon" should be deleted.

Line 49, "to red-eye" should read --to a red-eye--.

Line 55, "display unit" should read --transmitting means--; "a" should read --the--; and "is" should read --to--.

UNITED STATES PATENT AND TRADEMARK OFFICE
CERTIFICATE OF CORRECTION

PATENT NO. : 5,367,356

DATED : November 22, 1994

INVENTOR(S) : Ryuichi KOBAYASHI

It is certified that error appears in the above-indentified patent and that said Letters Patent is hereby corrected as shown below:

<u>COLUMN 11</u>

Line 16, "the" should be deleted.
    Line 17, "number" should read --a number--.

Signed and Sealed this

Sixth Day of June, 1995

Attest:

BRUCE LEHMAN

*Attesting Officer*    *Commissioner of Patents and Trademarks*